(12) United States Patent
Witzenberger

(10) Patent No.: US 7,757,580 B2
(45) Date of Patent: Jul. 20, 2010

(54) ACTUATING DEVICE FOR A VEHICLE TRANSMISSION

(75) Inventor: Max Witzenberger, Aindling (DE)

(73) Assignee: RENK Aktiengesellschaft, Augsburg (DE)

( * ) Notice: Subject to any disclaimer, the term of this patent is extended or adjusted under 35 U.S.C. 154(b) by 639 days.

(21) Appl. No.: 11/284,694

(22) Filed: Nov. 22, 2005

(65) Prior Publication Data

US 2006/0144181 A1 Jul. 6, 2006

(30) Foreign Application Priority Data

Nov. 22, 2004 (DE) .................. 10 2004 056 369

(51) Int. Cl.
*B60K 6/00* (2007.10)
*B60K 20/00* (2006.01)

(52) U.S. Cl. .................. 74/473.19; 74/473.36

(58) Field of Classification Search ............. 74/473.19, 74/473.33, 473.34, 473.36

See application file for complete search history.

(56) References Cited

U.S. PATENT DOCUMENTS 4,455,883 A * 6/1984 Radcliffe .................. 74/473.21
4,489,805 A * 12/1984 Okabe ..................... 180/271
4,561,325 A * 12/1985 Jester ..................... 74/745
5,904,632 A * 5/1999 Brown et al. .............. 475/206
6,598,494 B1 * 7/2003 Giefer ..................... 74/473.18

FOREIGN PATENT DOCUMENTS

| DE | 44 32 851 A1 | 3/1996 |
| DE | 199 00 412 A1 | 7/2000 |
| DE | 100 34 736 A1 | 4/2001 |
| DE | 696 15 624 T2 | 8/2002 |
| EP | 0 400 419 A1 | 12/1990 |
| FR | 2 797 486 A1 | 2/2001 |
| JP | 61171625 A | 8/1986 |
| JP | 4171358 A | 6/1992 |

* cited by examiner

*Primary Examiner*—Thomas R Hannon
*Assistant Examiner*—James Pilkington
(74) *Attorney, Agent, or Firm*—Crowell & Moring LLP

(57) ABSTRACT

An actuating device for vehicle transmissions, in particular of tracked vehicles or wheeled vehicles having a wheel-based steering system, for the remote shifting and emergency shifting of the vehicle transmission is disclosed. The actuating device has a signal transmitter for the driving direction of the vehicle. A single lever is provided for actuating the remote shifting for the driving direction and the emergency shifting and for producing a driving-direction signal.

13 Claims, 2 Drawing Sheets

ACTUATING DEVICE FOR A VEHICLE TRANSMISSION

This application claims the priority of German Patent Document No. 10 2004 056 369.1, filed Nov. 22, 2004, the disclosure of which is expressly incorporated by reference herein.

BACKGROUND AND SUMMARY OF THE INVENTION

The invention relates to an actuating device for a vehicle transmission, in particular of tracked vehicles or wheeled vehicles having a wheel-based steering system.

In particular in military vehicles having automatic transmissions, it is known in general to control the transmission by means of an electric remote controller. Here, electric signals are generated in a selector device, which electric signals are forwarded, for example via an electronic computer, to the electric actuating valves of the hydraulic transmission controller and trigger the corresponding shifting operation there. The electric signals which are generated contain information about the gear to be selected or automatic mode, and signals for the driving direction.

In military tracked vehicles, there is additionally a signal for the special case of precise pivoting of the vehicle about the vertical axis with a locked change-speed gearbox. Here, the levers for the gear and for the driving direction are separate, that is to say there is a separate lever for shifting the transmission ratio and a further separate lever for the driving direction.

Military vehicles are usually provided additionally with an emergency shifting device, in which the transmission hydraulics are acted on directly by means of a mechanical lever. When the emergency lever is actuated, the electric remote controller is switched off. This emergency shifting device is required in order for it to be possible to maintain an emergency driving mode if the electric devices or the electronics fail. The emergency shifting lever is a further separate lever which is usually also arranged in the vehicle in a manner which is spatially separate from the electric selector lever.

An additional mechanical signal for the driving direction is required for many additional devices on the vehicle, such as a steering-direction switchover means in a tracked vehicle or a wheeled vehicle having a wheel-based steering system.

Different signals for the driving direction which lead to malfunctions in additional devices of this type could be output by the different separate levers of the above-described transmission actuating devices.

It is the object of the invention to provide an operationally reliable actuating device for a vehicle transmission.

As a result of the actuation of the electric remote shifting and of the emergency shifting being combined according to the invention on one lever, it is advantageously prevented that a driving-direction signal provides incorrect results or results which are not expected by the driver as a result of the driving-direction lever and the emergency shifting lever being actuated in opposite directions.

In every one of its different functions, the actuating lever according to the invention advantageously always supplies a definite mechanical signal for forward or reverse driving.

As the actuation of the emergency shifting is not always monitored electrically, it is particularly advantageous for reasons of safety to assign an unchanging definite mechanical signal to the emergency shifting.

Further features and advantages result from the following description.

BRIEF DESCRIPTION OF THE DRAWINGS

In the following text, the invention will be described in greater detail using the associated diagrammatic drawings.

DETAILED DESCRIPTION OF THE DRAWINGS

Figure 1:
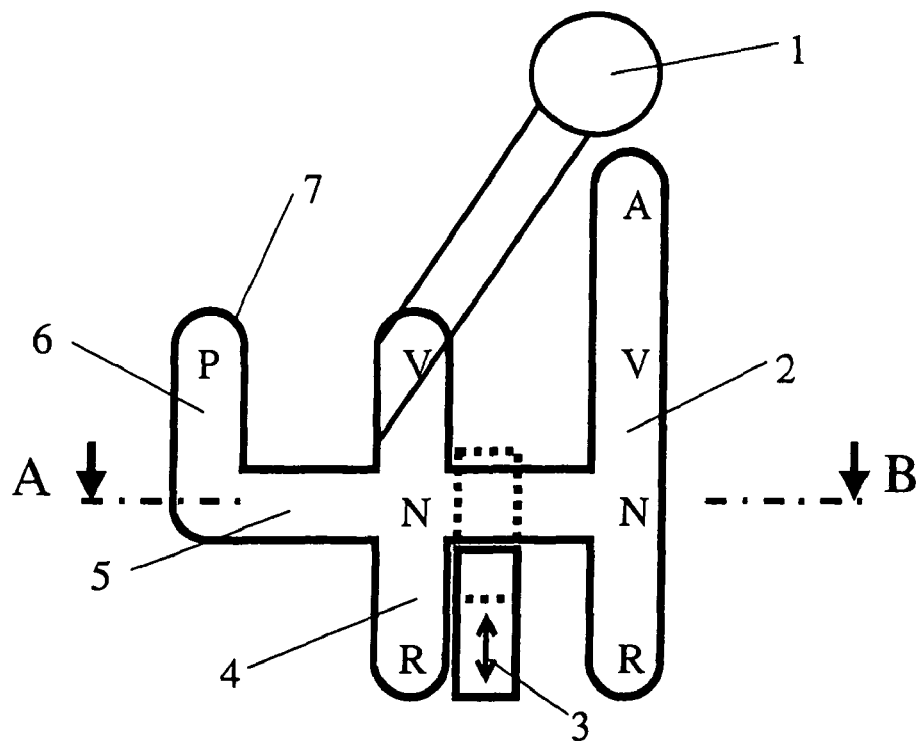
FIG. 1 shows an exemplary embodiment of an actuating device according to the invention.

FIG. 1 shows a lever 1 of an actuating device for a vehicle transmission, by way of which lever 1 the electric remote control, the pivoting of the vehicle about the vertical axis, and an emergency mode can be controlled.

In the normal mode, the lever 1 is moved in the remote shifting gate 4 of the shift gate 7, where it can be shifted into the position V for forward driving and into the position R for reverse driving. In the neutral position N, it can be moved via a transverse gate 5 into a shifting position P, by means of which pivoting of the vehicle about the vertical axis is brought about.

In order to leave the normal mode, a locking means 3 has to be opened, in order that the lever 1 can be moved via the transverse gate 5 into the emergency shifting gate 2. The locking means 3 is intended to prevent unintended emergency operation. In the emergency mode, the shifting lever 1 acts directly on the transmission hydraulics and can be shifted additionally into further positions, for example into the towing position A, in addition to the shifting positions reverse R, forward V and neutral N. For this number of shifting positions which is larger than in the normal mode, an overdriving element is preferably provided. That is to say, a resilient element is accommodated between the mechanical signal output and the emergency-shifting signal output, in such a way that the emergency shifting lever can be moved further, although the signal transmitter for the mechanical direction signal has reached its end position forward V and remains here.

Figure 2:
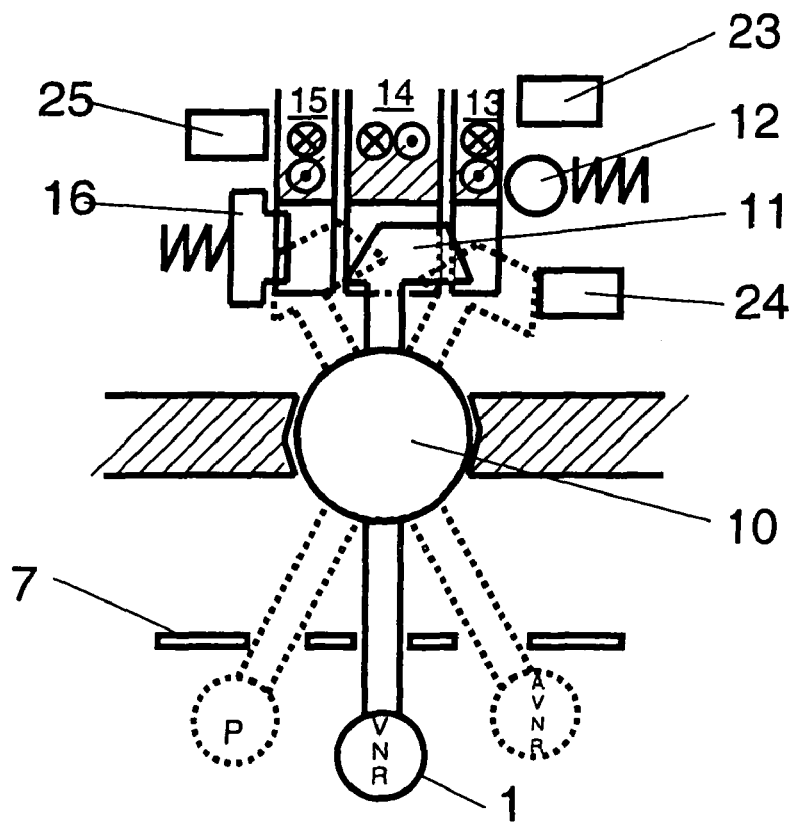
FIG. 2 shows the section A-B from FIG. 1.

FIG. 2 shows a section through the actuating device from FIG. 1, along the line A-B. The lever 1 is preferably mounted in a ball joint 10. It goes without saying that other lever mounting means are also possible which make both longitudinal and transverse movements possible in the shift gate 7. The shifting lever 1 is provided with a switching element 11 which interacts with signal transmission elements 13, 14, 15. If the shifting lever 1 is shifted into the remote shifting gate (4, FIG. 1) in the normal mode, the switching element 11 preferably engages with a form-fitting connection into the signal transmission elements 13 and 14, while the signal transmission element 15 is held in its current shifting position by a latch 16. When switching over into the emergency mode, the switching element 11 is brought into interaction with the signal transmission element 15 and the latch 16 is unlocked, the switching element 11 also acting on the signal transmission element 14 at the same time. The position of the signal transmission element 13 is fixed in this lever position by a latch 12.

The lever 1 according to FIG. 2 is moved into and out of the plane of the drawing by the longitudinal movement of the lever 1 in a gate (2, 4, 6, FIG. 1) of the shift gate 7, and the signal transmission elements 14 and 15 or 13 are moved out of and into the plane of the drawing, respectively, in accordance with the reversal by the lever mounting means 10.

An essential core concept of the invention is to be seen in the fact that the lever 1 always produces a definite signal for the driving direction in every one of its functional positions as a transmission remote shifting lever, a driving-direction lever or an emergency shifting lever, irrespectively of its different functions.

For this purpose, the switching element 11 engages into the centrally arranged signal transmission element 14 in every transverse position of the lever 1 and in each case determines a definite mechanical signal for the selected driving direction from the shifting positions forward, neutral and reverse.

The signal transmission element 13 which is arranged laterally next to the signal transmission element 14 determines electric signals from the mechanical signal of the lever 1 by means of electric sensors 23, which electric signals are transmitted to the electro-hydraulic transmission controller, for example via electronic computing units. Here, the position pivot P (pivoting about the vertical axis) is sensed by means of dedicated sensors 24. The signal transmission element 15 which is arranged on the other side of the signal transmission element 14 transmits the mechanical signals of the shifting lever 1 mechanically directly to the transmission hydraulics, with the result that the vehicle transmission can still be actuated even if the electric devices fail. In order that an actuation of the emergency shifting can be detected by the electronic transmission controller, sensors 25 which can also advantageously be accommodated in the combined selector device are provided in the hydraulic transmission controller.

Figure 3:
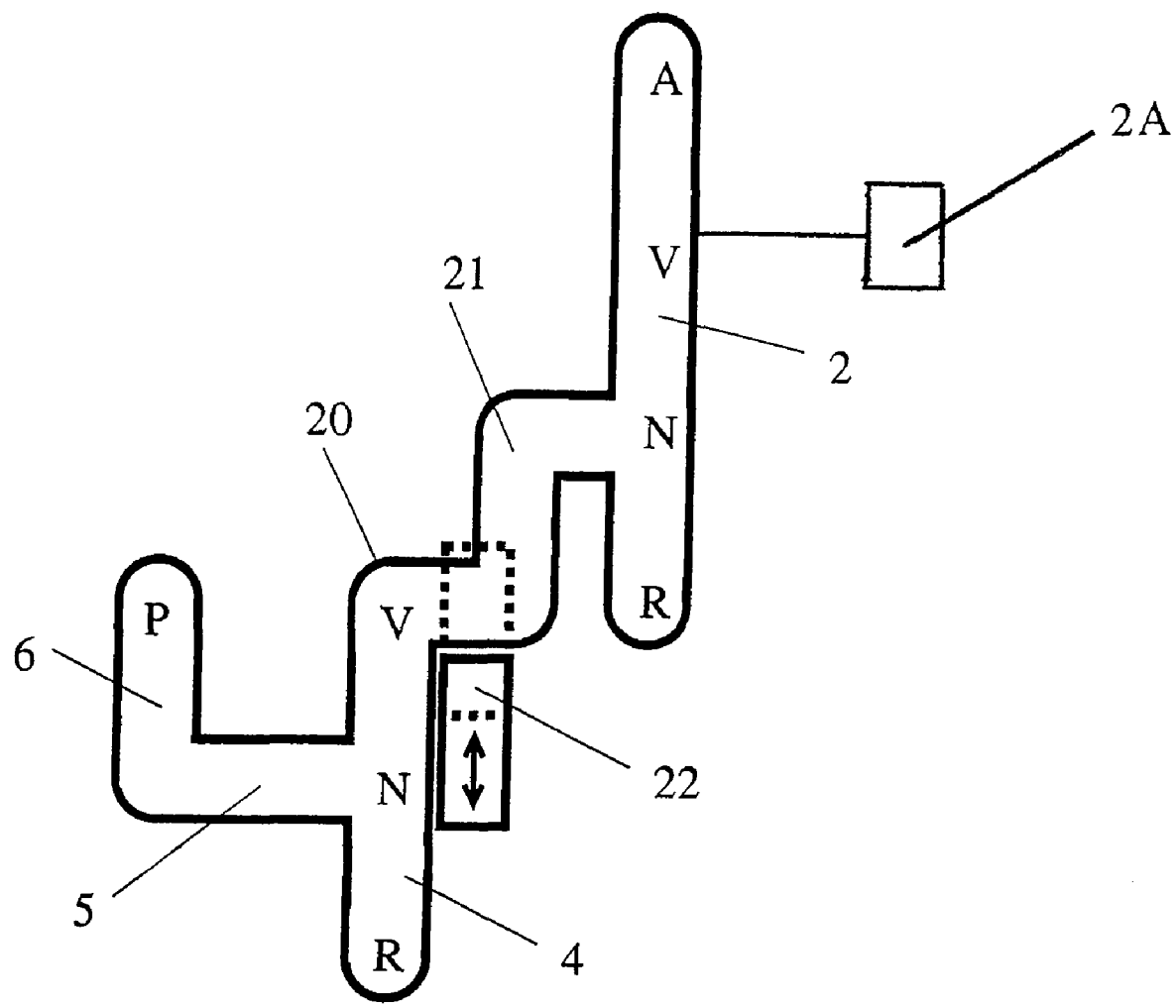
FIG. 3 shows a further exemplary embodiment of an actuating device according to the invention.

As the actuation of the emergency shifting is not always monitored electrically, it is particularly advantageous for reasons of safety to assign a definite mechanical signal to the emergency shifting. In the exemplary embodiment according to FIG. 3, a corresponding shift gate 20 is provided which has a transverse gate 21 for shifting over into the emergency mode only in the forward position of the normal mode. In order to avoid unintentional emergency shifting, a locking means 22 has to be released before shifting over into the emergency shifting gate 2. An overdriving element 2A is provided for reaching the shifting positions neutral, forward and towing in the emergency shifting gate 2. Every emergency shifting position (reverse, neutral, forward, towing) is assigned the definite mechanical driving-direction signal forward in an actuating device which is configured according to FIG. 3. It goes without saying that it is also possible to permit the switchover into the emergency mode only in the shifting position reverse in the normal mode, in which case every emergency shifting position (reverse, neutral, forward, towing) would then be assigned the definite mechanical driving-direction signal reverse. In vehicles having actuating devices according to the invention in accordance with FIG. 3, that is to say without a change in the driving-direction signal in the emergency mode, all the devices which require a signal of this type, such as a steering-direction reversal means, would be inactive.

Irrespectively of the configuration of the actuating device, releasable locking means can be provided which lock the lever 1 in every one of its positions against unintentional actuation. For this purpose, electrically acting sensors for monitoring the lever position and electrically acting locking means can be provided, for example.

LIST OF REFERENCE NUMERALS

1 Lever
2 Emergency shifting gate
2A Overdriving element
3 Locking means
4 Remote shifting gate
5 Transverse gate
6 Gate for pivoting about vertical axis
7 Shift gate
10 Lever mounting means
11 Switching element
12 Latch
13 Signal transmission element
14 Signal transmission element
15 Signal transmission element
16 Latch
20 Shift gate
21 Transverse gate
22 Locking means
23 Sensor
24 Sensor
25 Sensor
V Forward
N Neutral
R Reverse
P Pivoting about the vertical axis
A Towing The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An actuating device for vehicle transmissions, in particular of tracked vehicles or wheeled vehicles having a wheel-based steering system, comprising:
   a remote shifting gate, a pivoting gate, and an emergency shifting gate of a vehicle transmission;
   a single lever for actuating the remote shifting gate, wherein in the remote shifting gate the single lever is shiftable into a forward driving position, a neutral driving position, and a reverse driving position, wherein the single lever is provided for actuating a pivoting movement in the pivoting gate, and wherein the single lever is provided for actuating the emergency shifting gate, wherein in the emergency shifting gate the single lever is shiftable into a towing position, a forward driving position, a neutral driving position, and a reverse driving position;
   a switching element included on the single lever; and
   signal transmission elements associated with the pivoting gate, the remote shifting gate and the emergency shifting gate such that the switching element engages into the signal transmission element associated with the remote shifting gate, which is centrally located between the signal transmission elements associated with the pivoting gate and the emergency shifting gate, in every transverse position of the switching element and such that the switching element in every transverse position produces a driving-direction signal;
   wherein the signal transmission element associated with the pivoting gate determines a first electric signal from a first mechanical signal of the switching element by a first electric sensor and wherein the first electric signal is transmitted to an electro-hydraulic transmission controller;

wherein the signal transmission element associated with the emergency shifting gate transmits a second mechanical signal of the switching element mechanically to a transmission hydraulics;

and wherein the signal transmission element associated with the emergency shifting gate determines a second electric signal from the second mechanical signal of the switching element by a second electric sensor and wherein the second electric signal is transmitted to the electro-hydraulic transmission controller.

2. The actuating device according to claim 1, wherein different positions of the lever are lockable mechanically.

3. The actuating device according to claim 1, wherein the signal transmission elements are latchable in a definite position.

4. The actuating device according to claim 1, wherein a position of the lever is monitored and lockable electrically.

5. The actuating device according to claim 1, wherein an overdriving element is provided which increases a number of shifting positions in the emergency shifting gate than in the remote shifting gate.

6. The actuating device according to claim 1, wherein a signal which corresponds to an actual driving direction is generated by the actuating device in an emergency shifting function.

7. The actuating device according to claim 1, wherein the actuating device outputs a forward signal in an emergency shifting position, irrespectively of an engaged driving direction.

8. An actuating device for a transmission of a vehicle, comprising:

a single lever operative in a remote shifting gate of the vehicle transmission, wherein in the remote shifting gate the single lever is shiftable into a forward driving position, a neutral driving position, and a reverse driving position, a pivoting gate of the transmission, and an emergency shifting gate of the transmission, wherein in the emergency shifting gate the single lever is shiftable into a towing position, a forward driving position, a neutral driving position, and a reverse driving position; and a switching element, wherein the switching element interacts with signal transmission elements associated with the pivoting gate, the remote shifting gate and the emergency shifting gate such that the switching element engages into the signal transmission element associated with the remote shifting gate, which is centrally located between the signal transmission elements associated with the pivoting gate and the emergency shifting gate, in every transverse position of the switching element and such that the switching element in every transverse position produces a signal representative of a driving direction of the vehicle;

wherein the signal transmission element associated with the pivoting gate determines a first electric signal from a first mechanical signal of the switching element by a first electric sensor and wherein the first electric signal is transmitted to an electro-hydraulic transmission controller;

wherein the signal transmission element associated with the emergency shifting gate transmits a second mechanical signal of the switching element mechanically to a transmission hydraulics;

and wherein the signal transmission element associated with the emergency shifting gate determines a second electric signal from the second mechanical signal of the switching element by a second electric sensor and wherein the second electric signal is transmitted to the electro-hydraulic transmission controller.

9. The actuating device according to claim 8, wherein the pivoting gate of the transmission controls a pivoting of the vehicle about a vertical axis of the vehicle.

10. The actuating device according to claim 9, wherein the vehicle is a tracked vehicle or wheeled vehicle having a wheel-based steering system.

11. A method for actuating a transmission of a vehicle, comprising the steps of:

alternatively selecting between a remote shifting gate of the vehicle transmission, a pivoting gate of the transmission, and an emergency shifting gate of the transmission by a lever operative with each of the gates;

wherein in the remote shifting gate the lever is shiftable into a forward driving position, a neutral driving position, and a reverse driving position;

wherein in the emergency shifting gate the lever is shiftable into a towing position, a forward driving position, a neutral driving position, and a reverse driving position;

and wherein a switching element included on the lever interacts with signal transmission elements associated with the pivoting gate, the remote shifting gate and the emergency shifting gate such that the switching element engages into the signal transmission element associated with the remote shifting gate, which is centrally located between the signal transmission elements associated with the pivoting gate and the emergency shifting gate, in every transverse position of the switching element and such that the switching element in every transverse position produces a signal representative of a driving direction of the vehicle;

wherein the signal transmission element associated with the pivoting gate determines a first electric signal from a first mechanical signal of the switching element by a first electric sensor and wherein the first electric signal is transmitted to an electro-hydraulic transmission controller;

wherein the signal transmission element associated with the emergency shifting gate transmits a second mechanical signal of the switching element mechanically to a transmission hydraulics;

and wherein the signal transmission element associated with the emergency shifting gate determines a second electric signal from the second mechanical signal of the switching element by a second electric sensor and wherein the second electric signal is transmitted to the electro-hydraulic transmission controller.

12. The method according to claim 11, wherein the pivoting gate of the transmission controls a pivoting of the vehicle about a vertical axis of the vehicle.

13. The method according to claim 11, wherein the vehicle is a tracked vehicle or wheeled vehicle having a wheel-based steering system.

* * * * *